United States Patent [19]

Gundlach

[11] Patent Number: 4,595,852
[45] Date of Patent: Jun. 17, 1986

[54] ELECTROSTATIC GENERATOR

[76] Inventor: Robert W. Gundlach, 2434 Turk Hill Rd., Victor, N.Y. 14564

[21] Appl. No.: 599,199

[22] Filed: Apr. 11, 1984

[51] Int. Cl.[4] .............................................. H02N 1/00
[52] U.S. Cl. ................................................... 310/309
[58] Field of Search ................................ 310/308–310

[56] References Cited

U.S. PATENT DOCUMENTS

| | | | |
|---|---|---|---|
| 2,610,994 | 9/1952 | Bosch et al. | 310/309 |
| 2,644,903 | 7/1953 | Lehrer | 310/307 |
| 2,739,248 | 3/1956 | Meier | 310/309 |
| 2,756,352 | 7/1956 | Felici et al. | 310/308 X |

*Primary Examiner*—Donovan F. Duggan

[57] ABSTRACT

A novel induction-type electrostatic generator is disclosed in which moving electrodes are transported back and forth between two Faraday cages. Each moving electrode, once enclosed by a cage, is contacted to the cage, then separated by more than the sparking distance before making electrical connection to the opposite moving electrode or to ground. In this way, charge opposite in polarity but proportional in magnitude to the charge on each cage, is induced in each moving electrode and carried into and imparted onto the next cage, progressively elevating the cage potentials until the corona or arcing limits are reached. Initiation of charging is spontaneous, deriving from inevitable statistical imbalances in nature.

5 Claims, 4 Drawing Figures

ELECTROSTATIC GENERATOR

BACKGROUND OF THE INVENTION

This invention relates to electrostatic generators, and more particularly to an improved induction-type electrostatic generator that is efficient, compact, and inexpensive, in which electrodes are transported back and forth between two Faraday cages.

The Greeks were the first to record observations of static electricity several thousand years ago. They discovered that amber, when rubbed vigorously with fur or fabrics under dry conditions, takes on electrostatic charge. In fact, the Greek word for amber, "electron", has become the root of many of our words relating to electricity.

It was not until about 1660 that the first electrostatic generator was invented. Otto von Guericke of Magdeburg, Germany showed electrostatic sparks could be produced by spinning and rubbing a dry sulfur globe. In this device, high potentials were developed by friction, or triboelectric charging. More than 200 years passed before James Wimshurst invented the first reliable induction-type generator, called the "influence machine" at the time (1878). This involved two insulating discs sliding against each other as they rotated in opposite directions on a common axis. Attached to these oppositely rotating plates were metal sectors into which charges are induced and carried to a capacitor for storage. The metal sectors continue inducing opposite charges in each other and carrying the charges to the appropriate ends of the capacitor, gradually building up the potentials of the capacitor until sparking voltages are reached. Wimshurst built many such machines, some with oppositely rotating discs more than two meters in diameter. The only substantial application of the Wimshurst generator appears to have been to operate the early X-ray tubes.

Then, in 1937, Robert Van de Graaff invented a belt-type generator in which an insulating belt, sometimes carrying conducting elements, transported charges into a giant conducting sphere, or "Faraday cage", to generate, in some cases, over a million volts. Van de Graaff charged the moving belt by spraying corona charge onto it or, alternatively, by frictionally charging it.

In the 1960's Prof. A. D. Moore designed an induction-type generator for instructional purposes. This is the simplest of the prior art generators to understand, and works purely by induction, requiring neither corona nor frictional charging means to produce the potential differences. FIG. 1 is a schematic diagram of Moore's "Dirod" generator, which he described in his book "Electrostatics", (Doubleday, Garden City, NJ, 1968; a Doubleday Anchor Book). In this generator, rods $20_{(1 \to N)}$ are rotated between two collector electrodes, 22 and 24. Each rod makes momentary electrical contact to collectors 22 and 24 through flexible conducting brushes 23 and 25, respectively, as insulating disk 26 is rotated counterclockwise about its center. Just above and below rotating disc 26 are supported conducting rods 28 and 30, called "inductors", electrically connected to collector electrodes 22 and 24, respectively. At the point of nearest approach to each inductor, each of the rods $20_n$ is momentarily contacted, one at a time, to ground or to the opposite rod $20_{(n+N/2)}$ through flexible conducting brushes 29 and 31, respectively. Any incipient charge or potential difference between collector electrodes 22 and 24 will induce opposite charges in those rods $20_n$ and $20_{(n+N/2)}$ adjacent the inductors 28 and 30. For example, if we assume that, of the many billions of electrons in each of the collector electrodes, there is a slight excess in collector 22, then collector 24 will be slightly positive relative to collector 22. Inductor 28 will therefore induce positive charges in each rod $20_n$ as it is grounded in its proximity to inductor 28. At the same time inductor 30 induces negative charges in each rod $20_{(n+N/2)}$ when grounded next to inductor 30. As the charged rods separate from inductor rods 30 and 28, their potentials increase so that part of the induced charges flow off to the collector plates 22 and 24, increasing their negative and positive potentials, respectively. As the potentials of the collector electrodes increase, so the charges induced in rods $20_n$ by inductors 28 and 30 increase, quickly driving the collector electrodes to their maximum values. Once charging begins it will be seen how the potential difference grows at a progressively increasing rate. The statistical imbalance of nature insures that the initial imbalance can always be depended on. (To understand how the instability builds on itself, we need only understand why a sharpened pencil cannot be balanced long on its point; the restoring force is negative, and is proportional to the degree of imbalance.) Professor Moore's Dirod generator routinely produces 60 to 70 kV, depending on the spacing of the rods 20 from inductors 28 and 30, since air breakdown (arcing) occurs at about 30 kV per cm for gaps larger than a few millimeters. This generator is not entirely satisfactory for manufacturing as an educational toy or for use for demonstrations because it is relatively complicated and expensive to produce and complex to understand.

SUMMARY OF THE INVENTION

Accordingly, the present invention provides a simplified electrostatic generator for an educational toy. Also, the present invention provides an electrostatic generator that is more efficient, more affordable, more rugged, and easier to understand for teaching purposes and experimental uses than prior art devices.

The foregoing and other features of the instant invention will be more apparent from a further reading of the specification and claims and from the drawings, in which:

While the invention will be described hereinafter in connection with a preferred embodiment and an alternative embodiment, it will be understood that it is not intended to limit the invention to those embodiments. On the contrary, it is intended to cover all alternatives, modifications, and equivalents as may be included within the spirit and scope of the invention as defined by the appended claims.

DESCRIPTION OF THE PREFERRED EMBODIMENT

Figure 2A:
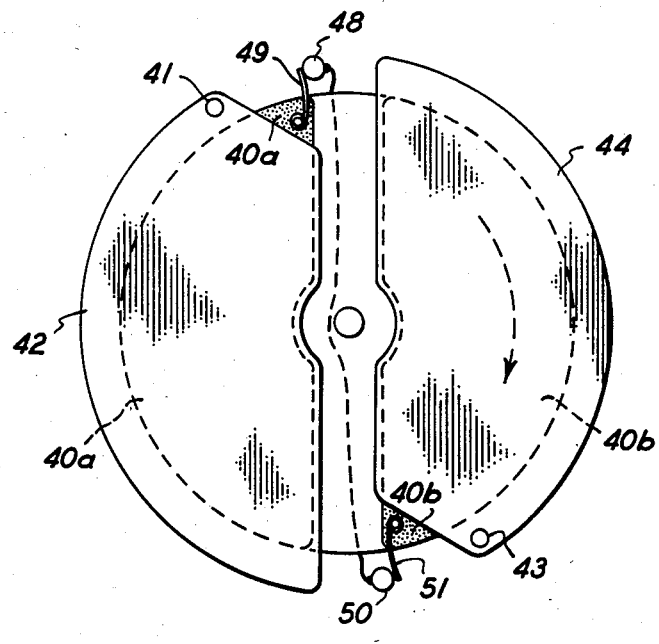
FIG. 2a is a schematic plan view of the preferred embodiment of the present invention.
Figure 2B:
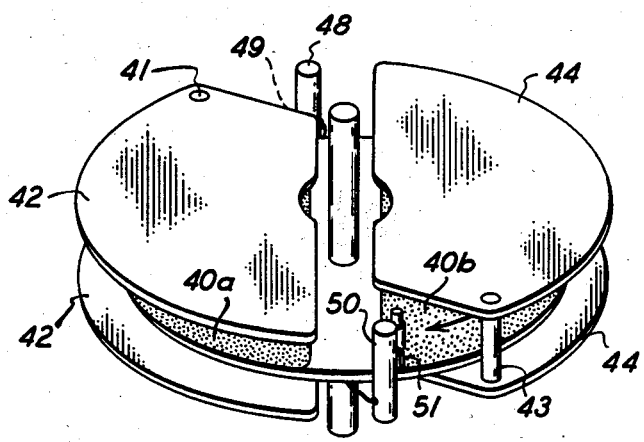
FIG. 2b is an isometric view of the preferred embodiment of the present invention.

In the pesent invention the induction-type generator has been simplified and made much more efficient by combining each pair of collector and inductor electrodes into a single Faraday cage, as shown in FIGS. 2a and 2b. As Faraday taught, and Van de Graaff put to use, by enclosing a charged object in a conducting cage, the potential of the whole cage is increased as if all the charges were placed onto the cage, itself. In fact, if the enclosed charged object is conducting and makes conductive contact with the cage, all charges do, indeed, flow from the charged object onto the surrounding "Faraday cage".

In this example only two rotor electrodes 40a and 40b are shown. In fact, any even number can be used, within practical space limitations. An odd number could be used if external ground is provided during charge induction. With an even number of rotor electrodes, contacts 48 and 50 can be connected to each other, instead of to external ground, to induce electrons from one rotor electrode to the other. Rotor electrode 40a is transported by clockwise rotation from one cage 42, to the other cage 44, making sequential contact first with the surrounding, or enclosing case, through contact post 43, then, after adequate separation from contact post 43, making momentary contact with ground or the opposite rotor electrode 40b through contact posts 50 and 48, whereby charges opposite to those on the enclosing cage are induced on each rotor plate and then transported to the opposite cage through brushes 49 and 51. This results in a progressive build-up of opposite electrostatic potentials on collector cages 42 and 44. Assuming thin, flat rotor plates 40, the capacitance of each rotor plate 40 to the shell or cage 42 when the plate is totally enclosed by the cage is given by:

$$C = \frac{K\epsilon_0 A}{t}$$

where C is capacitance, K is the dielectric constant of the medium (K=1 for air), $\epsilon_o$ is the permittivity of space ($\epsilon_o = 9 \times 10^{-12}$), A is the area of the surface of the rotor plate, and t is the distance between the rotor plate 40 and the inner surface of the shell 42. Each plate carries a charge q out of one shell and into the other shell every half rotation, equal to:

$$q = CV.$$

It is possible, then, to calculate the current that can be supplied by this generator for any specified values of rotor plate area A, distance t between the rotor plate 40 and the parallel surface of the cage 42, and speed of rotation of the rotor plates.

$$i = \frac{dq}{dt} = 4\omega CV$$

where $\omega$ is the spin velocity in rotations per second. For example, an area of 100 cm² on each face of the rotor plate (A=2×10⁻²m²), and a plate-to-cage spacing of 1 cm (t=10⁻²m), and a spin velocity of ten rotations per second, gives a generator current of:

$$i = 40 \, CV = 40 \times$$

$$\left( \frac{9 \times 10^{-12} \times 2 \times 10^{-2}}{10^{-2}} \right) V = 7.2 \times 10^{-10} V \text{ amperes}$$

Clearly, then, current is very low for very low voltages, but builds exponentially with time, the initial voltage build-up can be expedited by placing a charged object on one of the cages. Once the maximum potential of, say, 20 kV is reached, the generator of this example of the present invention would produce a current of:

$$i = 1.4 \times 10^{-5} \text{ amperes, or about 14 } \mu A$$

Figure 1:
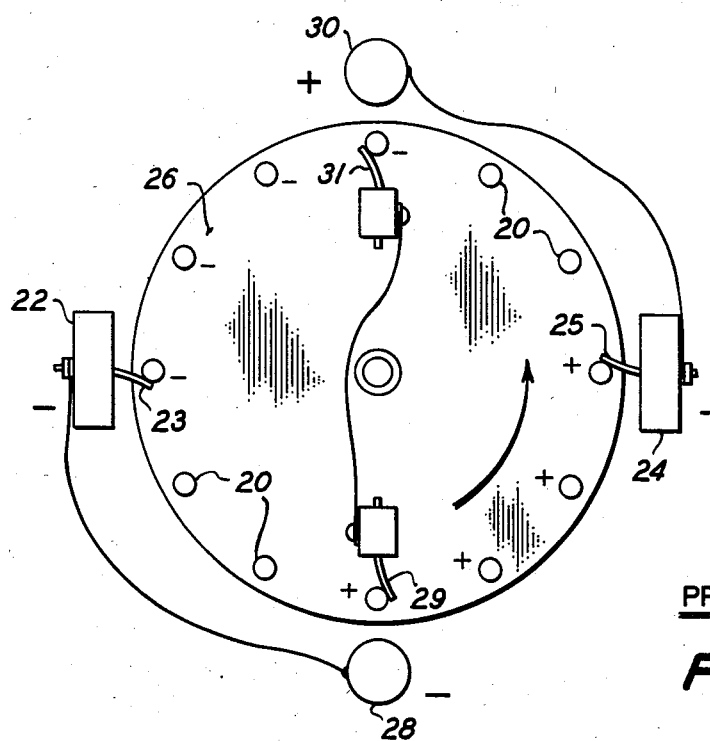
FIG. 1 is a schematic plan view of a prior art generator.
Figure 3:
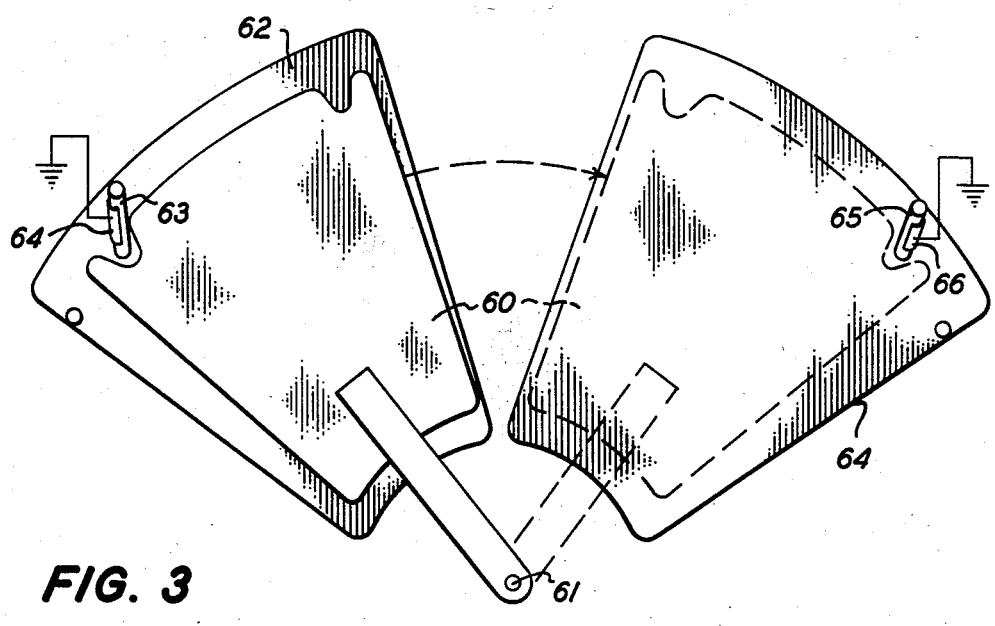
FIG. 3 shows an alternative embodiment of the present invention that employs a single mobile electrode.

FIG. 3 shows another embodiment of the present invention. Here a single mobile electrode 60 is mounted on a hinge 61 and swings reciprocally between Faraday cages 62 and 64. In this figure, the top plate of each cage 62 and 64 has been removed for clarity. Movable electrode 60 enters either cage 62 or 64, makes conducting contact with said cage, separates from said conducting contact by more than the sparking distance (1 cm for every 30 kV), and then makes the electrical contact to ground while it is still enclosed by said cage. During grounding, charges opposite to the charge on the enclosing cage are induced in electrode 60, and these are transported by movable electrode 60 into and deposited onto the opposite Faraday cage. Swinging contacts 63 and 65 prevent electrical contact between movable plate 60 and ground during entry of plate 60 to each cage, while they insure contact with conducting edges 64 and 66 during exit, while plate 60 is still fully enclosed within the associated Faraday cage. Since the charges induced on movable plate 60 are proportional to the charges on the enclosing cage, repeating the cyclic process produces progressively increasing potentials until corona or sparking limits are reached.

In summary, the advantages of the electrostatic generator of the present invention are its elegant simplicity for construction, for providing a simple understanding for the student, its ruggedness of design for portability without damage, affordability of cost, and its high efficiency derived by maximizing the rotor area and thus capacitance, for a given spacing, the spacing determining the inherent limitation of voltage imposed by dielectric breakdown of air or other fluid medium in which the generator is operated. If we wish to develop potentials of 30 kV operating in air, for example, the spacing of rotors 40 to cages 42 must be at least one cm, since the dielectric breakdown of air for such gaps is 30 kV/cm.

While the principles described herein have been described by the example of FIGS. 2a, 2b, and 3, it should be understood that the concepts disclosed can be embodied in various mechanical designs without departing from the teachings of this invention and may come within the scope of the following claims.

What is claimed is:

1. A spontaneous non-frictional electrostatic induction-type generator, comprising:
   (a) two Faraday cages:
   (b) electrode means, substantially surrounded by and mounted for rotary movement relative to said Faraday cages in order to enable said Faraday cages to serve alternately as both the inductor and collector electrodes: and
   (c) flexible contact means comprising a single set of brushes mounted to said rotary electrode means so as to extend by centrifugal force into electrical contact with said Faraday cages, then, after separating from each cage by more than the sparking distance, momentarily contacting each said flexible contact means to ground or to opposite ends of a conductor connecting said flexible contact means to each other to progressively charge said Faraday cages.

2. The spontaneous non-frictional electrostatic induction-type generator of claim 1, wherein said electrode means comprises an even number of movable electrodes, and flexible contact means mounted for centrifugal extension to make momentary electrical contact separately to each cage; then, after separating from each cage by more than the sparking distance, momentarily connecting said movable elctrodes to each other.

3. The method of claim 1, wherein an even number of rotary movable electrodes is provided, and means, mounted for extension by centrifugal force, is provided for contacting said rotary movable electrodes separately to each Faraday cage, then, after separating from each cage by more than the sparking distance, momentarily connecting said rotary movable electrodes to each other.

4. The spontaneous electrostatic induction-type generator of claim 1, wherein said electrode means comprises a plurality of movable electrodes.

5. A method of generating high electrostatic potentials using a spontaneous, non-frictional electrostatic induction-type generator comprising the steps of:
 (a) providing two Faraday cages;
 (b) providing electrode means substantially surrounded by and mounted for rotary movement relative to said Faraday cages; and
 (c) providing flexible contact means mounted to said rotary electrode means so as to extend by centrifugal force into electrical contact with each cage separately, then, after separating from each cage by more than the sparking distance, momentarily contacting to ground or to a neutral conductor, in order to progressively charge said Faraday cages.

* * * * *